United States Patent

[11] 3,560,635

[72] Inventor Walter Bruch
Hannover, Germany
[21] Appl. No. 626,481
[22] Filed Mar. 28, 1967
[45] Patented Feb. 2, 1971
[73] Assignee Telefunken Patentverwertungsgesellschaft m.b.H.
Ulm, Germany
[32] Priority Apr. 9, 1966, Oct. 14, 1966
[33] Germany
[31] T30887 and T32270

[54] SYSTEM FOR TRANSMITTING A NARROW-BAND LINE AND FOR SIMULTANEOUS REPRODUCTION OF SUCH SIGNAL
5 Claims, No Drawings

[52] U.S. Cl. .......... 178/5.4
[51] Int. Cl. .......... H04n 5/78, H04n 5/02
[50] Field of Search .......... 178/5.4 (3), 5.2, 5.4 (2); 178/5.4, 5.4 (CR), 5.4 (5)

[56] References Cited
UNITED STATES PATENTS

| | | | |
|---|---|---|---|
| 2,969,425 | 1/1961 | Hughes | 178/5.4 |
| 3,162,838 | 12/1964 | Sauvanet | 178/5.4X |
| 3,255,303 | 6/1966 | Kihara | 178/5.4X |
| 3,267,208 | 8/1966 | Brouard | 178/5.4X |
| 3,407,265 | 10/1968 | Krause | 178/5.4 |
| 2,903,505 | 9/1959 | Fine | 178/5.2 |
| 3,440,340 | 4/1969 | Sugihara | 178/5.4CR |

*Primary Examiner*—Robert L. Griffin
*Attorney*—Spencer and Kaye

ABSTRACT: In a recording or transmitting system for color television signals where three signals R,G,B representing three different color components are recorded or transmitted one after the other line by line, the three color signals are made available simultaneously in each line by means of two delaying devices each with the delay time of the length of one line.

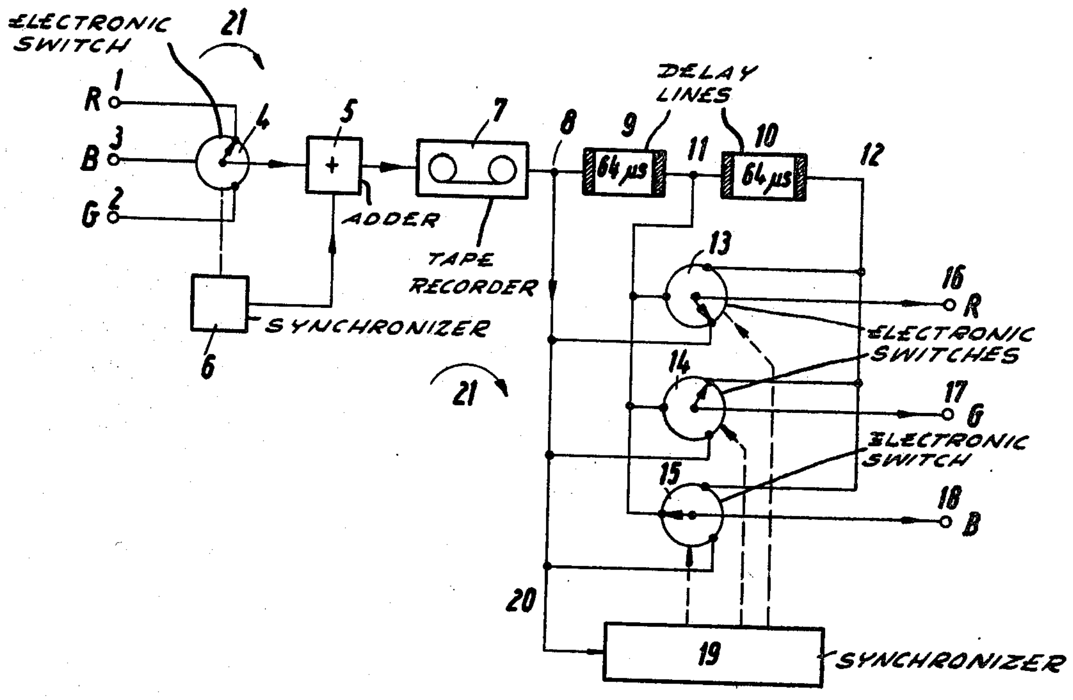

Inventor:
Walter Bruch
BY Spencer & Kaye
Attorneys

Inventor:
Walter Bruch
BY Spencer & Kaye
Attorneys

PATENTED FEB 2 1971 3,560,635

Inventor:
Walter Bruch
BY Spencer & Kaye
Attorneys

SYSTEM FOR TRANSMITTING A NARROW-BAND LINE AND FOR SIMULTANEOUS REPRODUCTION OF SUCH SIGNAL

The present invention relates to a system for transmitting recording and reproducing color television signals.

Great advances have been made in recent years in recording and reproducing television signals. Thus it has become possible to record, store and reproduce black and white as well as color television signals on magnetic tape. When recording a color television signal according to the NTSC, PAL or SECAM system on devices for home appliances, however, difficulties arise because the color carrier carrying the color information is in the upper range of the luminance band, e.g. 4.4 MHz and therefore outside the recording band width of the usual home appliances. The same difficulty exists in the case of a narrow-band transmission path. To avoid this drawback it is well known that the luminance signal and the color signals can be recorded alternately line by line and on reproduction with a delay line one of the signals can be repeated for the length of a line. The most favorable frequency position for the recording can then be selected for the luminance signal and the color signal independently of one another. The known system (U.S. Pat. No. 3,255,303 issued to Nobutoshi Kihara on Jun. 7th, 1966) suffers from the drawback, however, that the color signals are recorded at the same time so requiring different carriers for the color signal as well as frequency selectors for separating the color signals. Further there occurs crosstalk because the color signals are recorded simultaneously on the same track.

It is an object of the invention to provide an efficient and simple device for recording and reproducing or for transmitting a color television signal with good picture reproduction even for a small bandwidth. These and other objects are achieved, in accordance with the present invention, by transmitting or recording three color component signals alternating line-by-line, and passing said signals via a series connection of two delay devices having a delay of one line period each. From said delay devices there are derived simultaneously three different color component signals. For deriving the color component signals there are provided electronic switches having three input terminals and one output terminal each. Corresponding input terminals of the switches are interconnected to form a group. Every group is connected either to input, tap or output of the delay device.

It is also possible to make available in a continuous manner only one color signal suitable as brightness signal and use it for instance for representing a compatible black-and-white picture. The bandwidth of a delay device can be smaller than the bandwidth of the color component signals. In this case there are available in turn a direct color component signal with full bandwidth and the delayed color component signals with reduced bandwidth. In the case of this practical form the amplitude of the direct, undelayed color component signal can be raised e.g. by the factor 3 in the frequency band that is not transmitted by the delay devices. Further an aperture correction may be present which increases the definition of the picture. In this way, the impression is given of a sharp picture, although two lines are less sharp.

By means of the invention the advantage obtained is that a narrower band recording or transmission is possible. There is no crosstalk of the color signals, because in each line only one color signal is recorded or transmitted. Since in reproduction all three color signals are present simultaneously in each line, there is produced an impeccable picture of great brightness.

The invention is explained below in detail by reference to the drawing.

Figure 1:
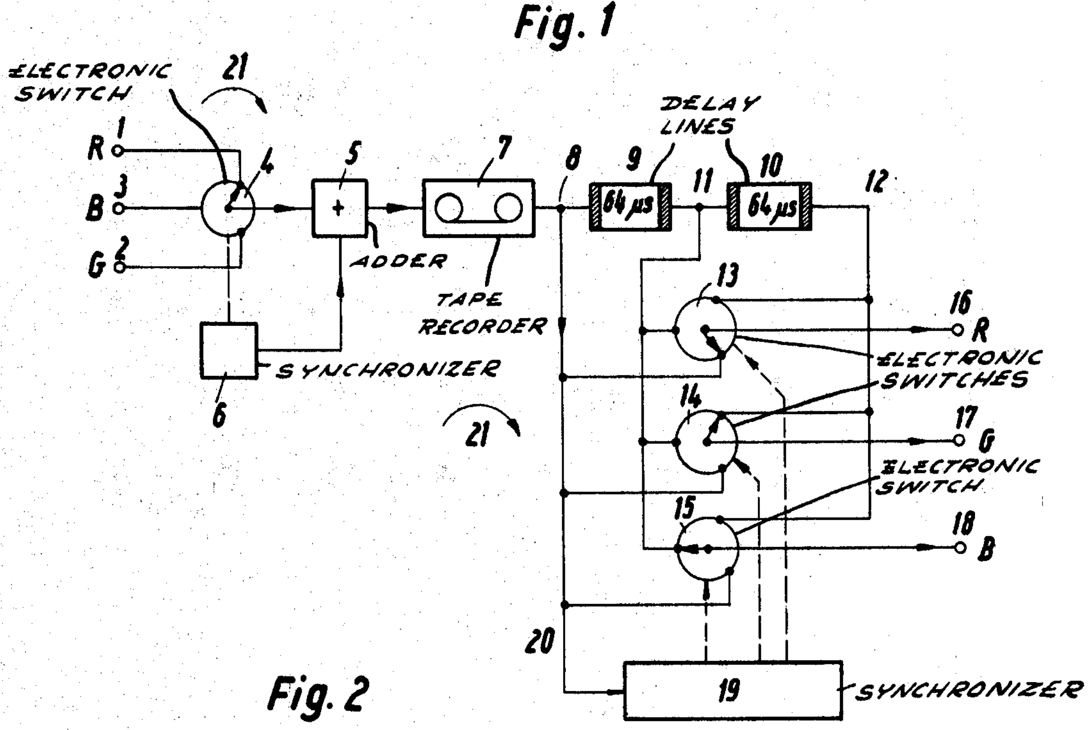
FIG. 1 shows a schematic wiring diagram of the invention.
Figure 2:
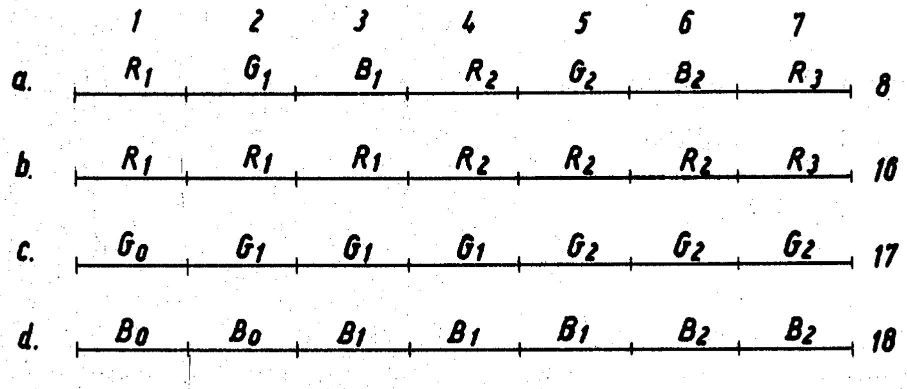
FIG. 2 shows diagrams for explaining the method of operation of the invention.

In FIG. 1, at the terminals 1, 2, 3 the color component signals R, G, B representing the three different primary colors are constantly available. With an electronic switch 4 "rotating" (for explanatory purposes) in the direction 21 the three color signals R, G, B are tapped one after the other connection to each input terminal being equal to one picture line period, and passed to an adding stage 5. The switch 4 is controlled by a synchronizing stage 6, which moreover in the adding stage 5 adds to the color signals characteristic pulses for identification. The line sequence color signals appearing at the output of adder 5 have the sequence illustrated in line *a* of FIG. 2 are passed to a tape recorder 7 and recorded there. The tape recorder 7 can also be a difficult, narrowband transmission channel, e.g. a cable. In FIG. 2, each subscript denotes the sequence number of a complete color cycle R, G, B and the numbers across the top of the FIG. designate successive picture lines. At the output 8 of the tape recorder 7, during reproduction, occur the signals according to line *a* of FIG. 2, and they pass to the input of the series connection of two delay lines 9 and 10 each having a delay time equal to the period of one picture line. To the input 8, the center point 11 and the end 12 of the series circuit are connected the first, second and third inputs of three changeover switches 13, 14, 15, whose outputs are connected with terminals 16, 17, 18. The changeover switches 13, 14, 15 continue switching after each line and are controlled by a synchronizer 19, which is controlled across a line 20 by the characteristic pulses coming from the magnetic tape recorder 7. Lines *b*, *c* and *d* of FIG. 2 illustrate the signals appearing at outputs 16, 17 and 18, respectively.

The method of operation of this arrangement is explained below by means of FIG. 2. The color component signal R2 occurring during picture line 4 at the point 8 can be derived during picture line 5 at the point 11 and during picture line 6 at the point 12. In the position shown the switch 13 passes this color signal from point 8 to the terminal 16. The switch 14 in the position shown derives from point 12 the color signal G1 from picture line 2, which is available during picture line 4 delayed by two picture line periods by the delay lines 9 and 10. The switch 15 in the position shown derives from point 11 the color signal B1 originally associated with picture line 3. The switches 13, 14, 15 now continue switching at the picture line frequency in the direction of the arrow 21. During the picture line 5 the switch 13 derives the color signal R2 from point 11, switch 14 the color signal G2 from point 8 and switch 15 the color signal B1 from point 12. The switches 13, 14, 15 are actuated at the line frequency with a switch phase such that there are produced without interruptions at the terminals 16, 17, 18 the color signals R, G, B according to lines *b*, *c*, *d* of FIG. 2 and indeed each color signal is identical every three lines. These color signals can then be used for simultaneous reproduction.

The signals will be transmitted via the delay lines 9, 10 and the switches 4, 13, 14, 15 particularly e.g. by carrier frequency. For instance, at the output of the tape recorder 7 there is provided a modulator, while in the three lines from the points 8, 11, 12 to the switches 13, 14, 15 there is arranged in each case a corresponding demodulator. If the color signals are recorded in the form of a frequency modulated color carrier, this carrier can be passed straight from the tape recorder 7 to the delay lines, 9, 10.

In the case of a further practical form of the invention there is recorded a combination of signals containing alternately line-by-line only the low frequencies of the three color signals and in each line a luminous density signal containing the high frequencies. This solution is based on the following knowledge: To obtain the best possible definition it is desirable to record or transmit as much as possible in each line of the luminous density share of the color picture which is decisive for the definition of the picture, while limiting the sequence recording or transmission to the narrowest possible frequency band. It has been found that for the line sequential color signals a bandwidth of 600 kHz. suffices. If the high frequencies of all the color signals that are decisive for the definition are recorded or transmitted in each line, the definition in vertical direction is improved compared with the processes known and proposed. What is more, the brilliance of the picture is enhanced, because at the high frequencies all the color signals participate in each line. As the bandwidth of the sequence color signals is reduced, the delaying devices for repeating these color signals only have to be designed for a smaller frequency band. Such a practical form of the invention is represented in FIGS. 3—6.

Figure 3:
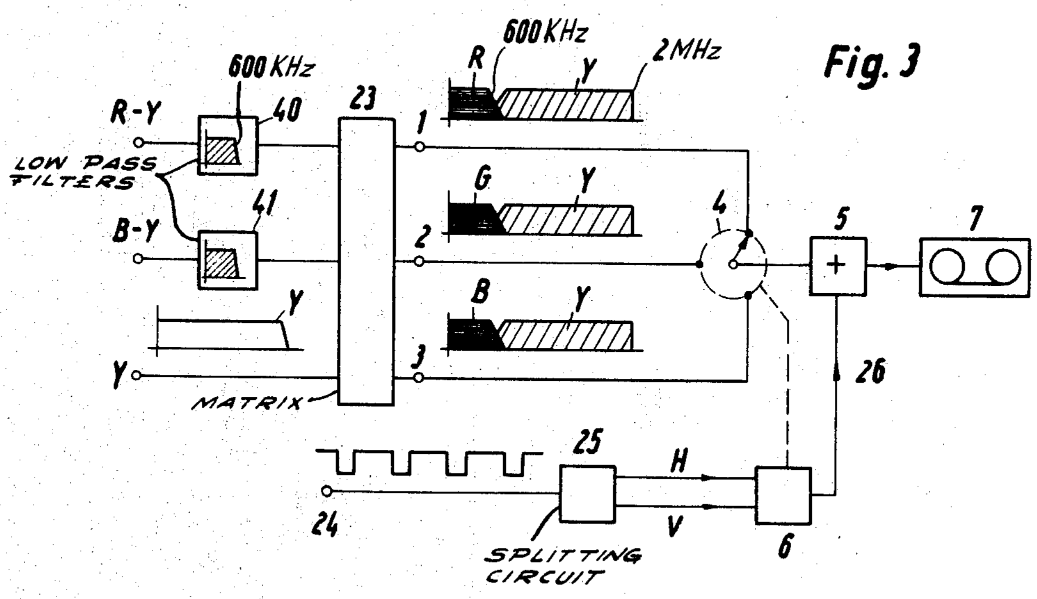
FIGS. 3 to 6 show further four practical examples of the invention. The same parts are given the same references in the FIGS.

In FIG. 3, the two color difference signals R–Y and B–Y are limited in two low-pass filters 40, 41 to a bandwidth of about 600 kHz. and passed to a matrix 23, to which there is moreover passed a luminance signal Y with a bandwidth of about 2 MHz. The matrix 23 forms at the output terminals 1, 2, 3 signal combinations consisting approximately in the frequency band from 0 to 600 kHz. of the color signals, R, G, B representing the primary colors, and approximately in the frequency band form 600 kHz. to 2 MHz of the luminous density signal Y, which is composed of all three color signals R, G, B. The combinations of signals at the terminals 1, 2, 3 are passed to three outputs of the switch 4 actuated in line frequency. From a terminal 24 a series of synchronizing pulses is passed to a splitting circuit 25, which controls the synchronizing stage 6, e.g. a ring counter, with line synchronizing pulses and vertical synchronizing pulses. The counter 6 controls the line frequency switch 4, which passes line-by-line one after the other the combination signals from the terminals 1, 2, 3 to the adding stage 5, in which there is added to the signal a characteristic pulse also coming from the counter 6 over a line 26. This characteristic pulse which is recorded for instance once or twice during the vertical blanking out time, indicates that a determined color, e.g. red, is just coming. This is necessary in order during reproduction to connect the color signals with the relevant color channel. From the adding stage 5, the combination signals of the terminals 1, 2, 3 pass alternately line-by-line to the tape recorder 7.

Figure 4:
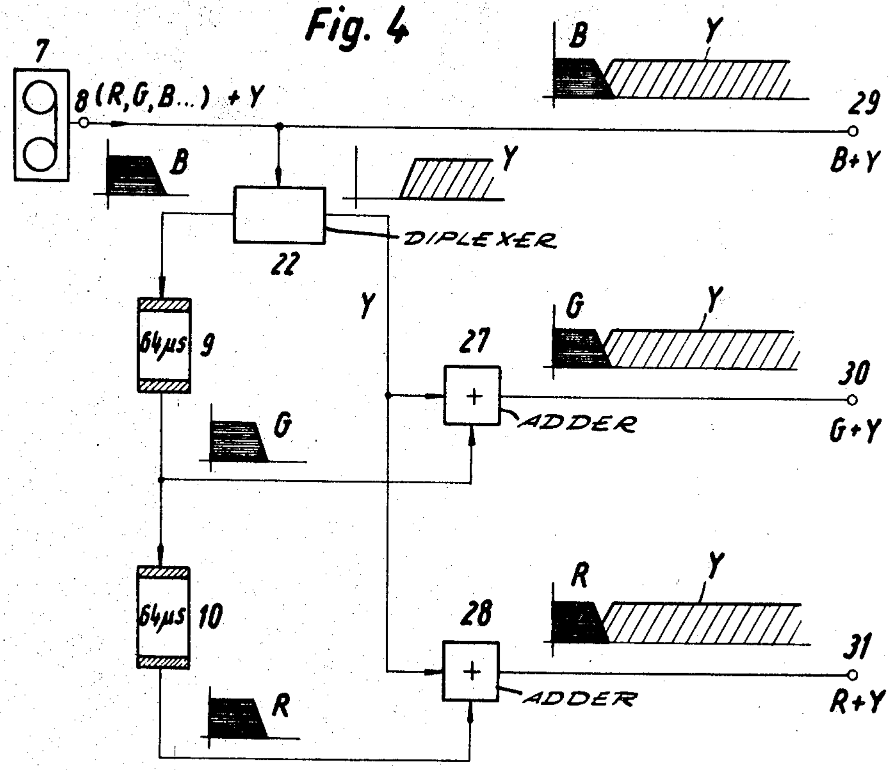

In FIG. 4 there appear on reproduction at the terminal 8 line-by-line in turn the signals of the terminals 1, 2, 3 of FIG. 3 tapped from the tape recorder 7. By means of a diplexer 22 this combination is split into the lower frequencies up to 600 kHz. and the upper frequencies from 600 kHz. to 2 MHz. The lower frequencies are passed to the series connection of the delay lines 9, 10 whose center point and end are connected to two adding stages 27, 28. The method of operation of this arrangement is as follows: Let it be assumed that precisely the color signal B with the luminance signal Y is at the terminal 8. At the terminal 29 there is then directly the combination signal B + Y. At the terminal 30 is the signal G + Y, with G from the previous line in time, and at the terminal 31 the signal R + Y, with R from two previous line in time. Now if from line-to-line the signals B, G, R are interchanged line-by-line at the three terminals 29, 30, 31, at these terminals there will always be the luminance signal Y. With a switch changing over in line frequency between the terminals 29—31 as in FIG. 1, a combination signal is now passed in each case to the relevant color channel, e.g. the combination signal G + Y always to the green color channel. In the range of the high frequencies from 600 kHz. to 2 MHz, all the color signals are always represented in all the color channels, whereby good resolution in a vertical direction and good brightness are obtained.

Figure 5:
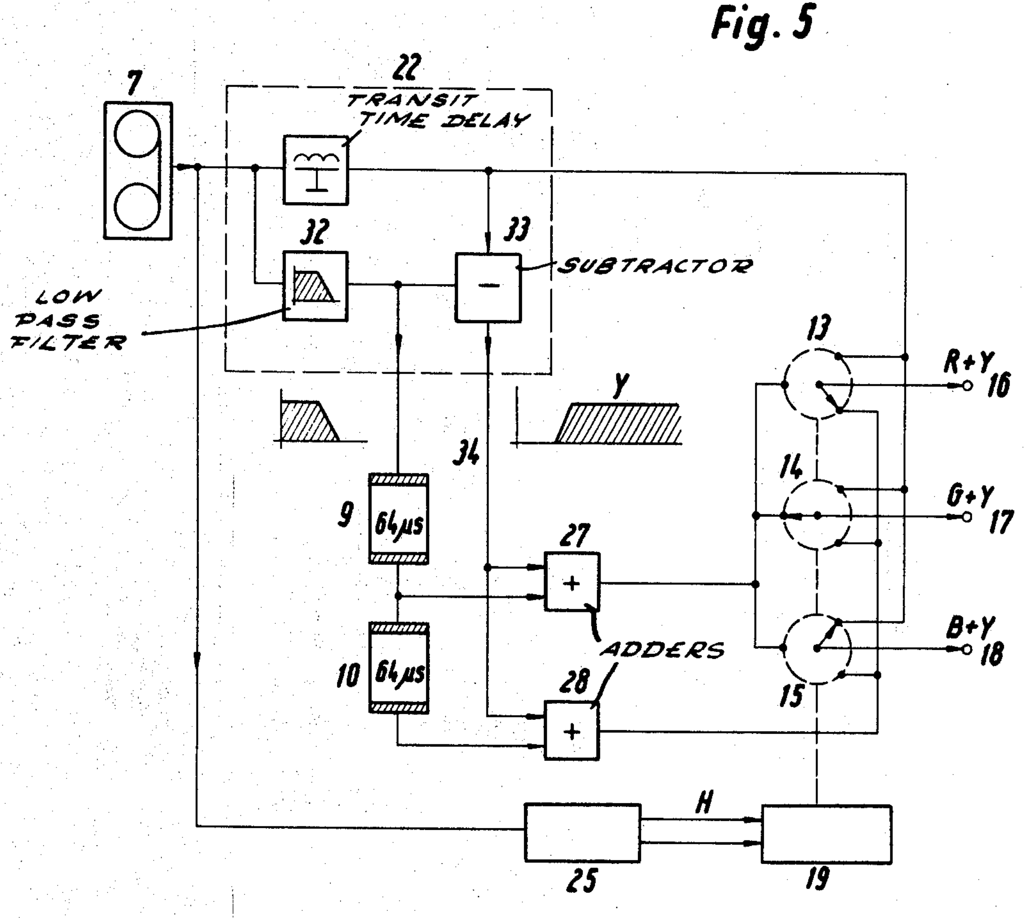

A circuit for reproduction with line frequency switches 13, 14, 15 is represented in FIG. 5. The switches 13, 14, 15 are controlled by the ring counter acting as synchronizer as in FIG. 1 in such a way that at the output of each switch there is always furnished the combination signal assigned to the same color, which can for instance be used for controlling a reproduction tube. The splitting up of the combination signal coming from the tape recorder 7 into the low frequencies and the luminance signal Y takes place here in the following way: with a low-pass 32, which forms part of the diplexer 22, only the low frequencies up to 600 kHz. are allowed through and passed as in FIG. 4 to the delay lines 9, 10. These low frequencies are moreover subtracted from the combination signal in a subtraction stage 33, so that in this way, from the combination signal B + Y or G + Y there is produced the pure luminance signal Y on a line 34. This solution has the advantage that the low frequencies at the output of the low-pass 32 or at the lower inputs of the adding stages 27, 28 and the high frequencies of the luminance signal Y at the upper inputs of the adding stage 27, 28 supplement one another to form the complete frequency band. To improve the reproduced picture, the luminance signal Y, for instance at the line 34, can be delayed by the length of a line compared with the color signals.

Figure 6:
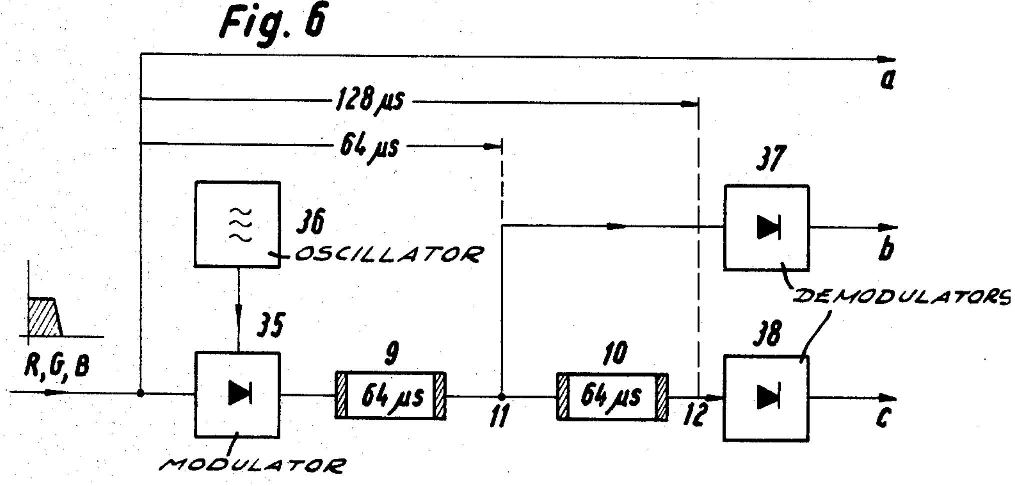

According to FIG. 6 the low frequencies that represent line-by-line in turn the color signals R, G, B and come for instance in FIG. 5 from the low-pass 32 are modulated in a modulator 35 on a carrier coming from an oscillator 36 (e.g. of the usual color carrier frequency). This carrier reaches the first delay line 9 and passes thence to the second delay line 10. The voltage at the connecting point 11 of the delay lines 9, 10 ant at the output 12 of the delay line 10 is demodulated in two demodulators 37, 38. At the output terminals *a*, *b*, *c* there are then again available the low frequencies from a line, the previous line in time, and two previous lines in time.

The luminance signal Y separated in FIGS. 4 and 5 selectively from the combination signal can be added again, instead of to the color signals R, G, B directly to the brightness control electrode of a picture tube. In FIGS. 4 and 5, for the sake of simplification, the diplexer 22 is only contained in two channels and the undelayed channel (in the picture just B + Y) is connected directly to the inputs of the changeover switches 13, 14, 15. In principle, splitting can take place in all the channels, twice after delay and once undelayed they are reassembled.

To avoid interfering patterns in the reproduced picture, the signal sequence can be reversed periodically, e.g. after every screen or picture, e.g. from R, G, B to R, B, G, or the phase position of a color cycle R, G, B and be shifted by one or two lines.

I claim:

1. In a system for transmitting and reproducing a narrow-band color television signal whose color information is contained in three color component signals each containing information relating to a respective one of three primary colors, the improvement comprising, in combination:

a. signal generating means for producing the three color component signals simultaneously;

b. first switch means connected to said signal generating means and having an output, said switch means being constructed and operated for delivering only one component signal at a time to said output and for switching cyclically from one component signal to the next at the picture line scanning rate, whereby there appears at said output a signal train composed of segments derived from each of said component signals in succession, each segment having a duration equal to one picture line scanning period;

c. a transmission path having one end connected to said first switch means output;

d. a first delay line having its input connected to the other end of said transmission path, and a second delay line having its input connected to the output of said first delay line, each said delay line producing a signal delay equal to one picture line scanning period;

e. second switch means having first, second and third inputs and first, second and third outputs, said first input being connected directly to said other end of said transmission path, said second input being connected directly to the output of said first delay line, and said third input being connected directly to the output of said second delay line;

f. means connected to said switch means for cyclically connecting each said output of said switch means to each of its said inputs in succession, each said output being switched from one input to the next at a rate equal to the picture line scanning frequency, and for establishing a phase difference between the switching cycles of said outputs such that at any given instant each said output is connected to a respectively different one of said inputs, whereby each said output receives only a different respective one of said color component signals and said three outputs of said switch means provide, during each line scanning period, portions of each of said color signals components; and g. means connected in said system for adding a luminance signal to each said color component signal segment applied to said first switch means, each said color component signal segment and its associated luminance signal occupying substantially mutually exclusive frequency bands.

2. An arrangement as defined in claim 1 wherein said second switch means comprises three switches each having three inputs connected to said first, second and third inputs, respectively, and each having only a respective one of said first, second and third outputs.

3. An arrangement as defined in claim 2 further comprising a television tape recorder disposed in said transmission path.

4. An arrangement as defined in claim 1 further comprising frequency filter means connected in circuit ahead of said delay lines for separating said luminance signal from each said color component signal segment so as to permit only the color component signal segment to be delivered to said delay lines, and means for adding said luminance signal to each said color component signal segment after said segment as been delayed in said delay lines.

5. An arrangement as defined in claim 4 wherein said filter means comprise means for subtracting each component signal segment from its associated luminance signal.

UNITED STATES PATENT OFFICE
CERTIFICATE OF CORRECTION

Patent No. 3,560,635 Dated February 2nd, 1971

Inventor(s) Walter Bruch

It is certified that error appears in the above-identified patent and that said Letters Patent are hereby corrected as shown below:

Change the title of the patent, both in the heading and in Column 1, to --SYSTEM FOR TRANSMITTING A NARROW-BAND LINE-SEQUENTIAL COLOR TELEVISION SIGNAL AND FOR SIMULTANEOUS REPRODUCTION OF SUCH SIGNAL--. In the heading of the patent line 15, change "No Drawings" to --6 Drawing Figs.--. Column 2, line 5, after "other" insert --, the duration of-- line 74, after "600kHz." insert --or only 300 kHz--.

Signed and sealed this 6th day of July 1971.

(SEAL)
Attest:

EDWARD M.FLETCHER,JR.
Attesting Officer

WILLIAM E. SCHUYLER, JR.
Commissioner of Patents